(12) United States Patent
Ichikawa et al.

(10) Patent No.: US 8,048,508 B2
(45) Date of Patent: *Nov. 1, 2011

(54) PLUGGED HONEYCOMB STRUCTURE

(75) Inventors: Yukihito Ichikawa, Nagoya (JP);
Koichi Ito, Nagoya (JP); Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/471,130

(22) Filed: May 22, 2009

(65) Prior Publication Data

US 2009/0239032 A1    Sep. 24, 2009

Related U.S. Application Data

(63) Continuation of application No. PCT/JP2008/055925, filed on Mar. 27, 2008.

(30) Foreign Application Priority Data

Mar. 27, 2007 (JP) ................................. 2007-082307

(51) Int. Cl.
   *B32B 3/12* (2006.01)
   *B01D 39/06* (2006.01)
(52) U.S. Cl. ............................ 428/116; 428/117; 55/523
(58) Field of Classification Search ........................ None
   See application file for complete search history.

(56) References Cited

U.S. PATENT DOCUMENTS

| | | | |
|---|---|---|---|
| 5,514,446 A | 5/1996 | Machida et al. | |
| 5,629,067 A | 5/1997 | Kotani et al. | |
| 6,673,414 B2 | 1/2004 | Ketcham et al. | |
| 2005/0095179 A1 | 5/2005 | Kasai et al. | |
| 2005/0106356 A1 | 5/2005 | Ikeshima | |
| 2005/0120691 A1 | 6/2005 | Miwa | |
| 2005/0210848 A1 | 9/2005 | Kuki et al. | |
| 2006/0168927 A1* | 8/2006 | Watanable et al. | ............. 55/523 |
| 2006/0249888 A1 | 11/2006 | Ishihara et al. | |
| 2006/0280905 A1 | 12/2006 | Ichikawa | |

(Continued)

FOREIGN PATENT DOCUMENTS

CN 1643239 A 7/2005

(Continued)

OTHER PUBLICATIONS

May 17, 2010 Office Action issued in U.S. Appl. No. 12/472,838.

(Continued)

*Primary Examiner* — Gordon R Baldwin
(74) *Attorney, Agent, or Firm* — Oliff & Berridge, PLC

(57) ABSTRACT

A honeycomb structure comprising porous partition walls which form, by surrounding, a plurality of cells extending between the two ends faces of the honeycomb structure, and an outer wall formed integrally with the partition walls. The cells consist of partial cells of outermost peripheral portion, having incomplete cell sections, which are located at the outermost peripheral portion of the honeycomb structure and are in partial contact with the outer wall, and complete cells having a complete cell section, other than the partial cells of outermost peripheral portion. In the complete cells, a plugged part is formed at one end of each complete cell so that each end face of the honeycomb structure shows a checkerwise plugging pattern. In the partial cells of outermost peripheral portion to be plugged according to the above-mentioned plugging pattern, part of them is plugged in the entire length and formed integrally with the outer wall and remaining cells have each a plugged part only at one end.

11 Claims, 3 Drawing Sheets

U.S. PATENT DOCUMENTS

| | | |
|---|---|---|
| 2007/0068128 A1 | 3/2007 | Oshimi et al. |
| 2007/0137158 A1 | 6/2007 | Sorensen |
| 2007/0184241 A1 * | 8/2007 | Ichikawa .................. 428/117 |

FOREIGN PATENT DOCUMENTS

| | | |
|---|---|---|
| GB | 2 071 640 A | 9/1981 |
| JP | A 56-129042 | 10/1981 |
| JP | A 58-45715 | 3/1983 |
| JP | A-62-294425 | 12/1987 |
| JP | B2 63-12658 | 3/1988 |
| JP | A 5-269388 | 10/1993 |
| JP | A 7-246341 | 9/1995 |
| JP | A-2001-300922 | 10/2001 |
| JP | A 2003-260322 | 9/2003 |
| JP | A 2004-154718 | 6/2004 |
| JP | A 2004-154768 | 6/2004 |
| JP | A-2005-144284 | 6/2005 |
| JP | A-2005-270755 | 10/2005 |
| JP | A 2007-21483 | 2/2007 |
| WO | WO 2007/023653 A1 | 3/2007 |

OTHER PUBLICATIONS

Oct. 25, 2010 Office Action issued in U.S. Appl. No. 12/472,838.

* cited by examiner

PLUGGED HONEYCOMB STRUCTURE

This is a Continuation of International Application No. PCT/JP2008/055925 filed Mar. 27, 2008, which claims the benefit of Japanese Application No. 2007-082307 filed Mar. 27, 2007. The disclosure of the prior applications is hereby incorporated by reference herein in its entirety.

TECHNICAL FIELD

The present invention relates to a honeycomb structure plugged at one end of each cell, used in a diesel particulate filter, etc.

BACKGROUND ART

In the past, ceramic-made honeycomb structures have been used as a diesel particulate filter (DPF) for capturing fine particles present in automobile exhaust gases, particularly diesel fine particles.

Generally, these honeycomb structures comprise porous partition walls which form, by surrounding, a plurality of cells extending between the two end faces of the honeycomb structure, and an outer wall formed integrally with the partition walls; and, in the honeycomb structures, a plugged part is formed at one end of each cell so that each end face of the honeycomb structure shows a checkerwise plugging pattern with the two patterns being complementary to each other.

FIG. 5 is a plan view which partially shows the end face of such a honeycomb structure having plugged parts are formed (a plugged honeycomb structure); and FIG. 6 is a partial sectional view which shows an example of the c-c section structure of FIG. 5. As shown in these figures, it is ordinary in a conventional, plugged honeycomb structure 21 that, in the partial cells 5 of outermost peripheral portion, having an incomplete cell section, which are located at the outermost peripheral portion of the honeycomb structure and are in partial contact with the outer wall 4, as well as in the complete cells 6 having a complete cell section, other than the partial cells 5 of outermost peripheral portion, a plugged part 8 is formed at one end of each cell and each end face of the honeycomb structure shows a complete checkerwise pattern (a houndstooth check).

When, as above, a plugged part is formed in plugging-necessary cells and no plugged part is formed in plugging-unnecessary cells, in all the cells including the partial cells 5 of outermost peripheral portion, the resulting honeycomb structure, when used in a DPF, etc., can provide a maximum effective filtration area when used as a filter. It is deemed to be ideal. However, the partial cells 5 of outermost peripheral portion are in contact with the outer wall 4 of the honeycomb structure and, as compared with the complete cells 6, have an irregular shape (a partially-chipped shape) and are small in area; therefore, formation of plugged part 8 is difficult in the partial walls 5. Particularly in those partial cells 5 of outermost peripheral portion having a very small area of less than 5% of that of each complete cell 6, formation of plugged part 8 needs much trouble and labor.

In order to reduce such labor and increase the mechanical strength of honeycomb structure, there is known a honeycomb structure in which the partial cells of outermost peripheral portion are plugged with a heat-resistant material or with the same material as for the honeycomb structure, or the partial cells are plugged in the entire length and formed integrally with the outer wall (see, for example, Patent Documents 1 and 2). There is also known a honeycomb structure in which not only the partial cells of outermost peripheral portion but also part of the complete cells present inside to the partial cells are plugged (see, for example, Patent Document 3). However, when not only the partial cells of outermost peripheral portion but also part of the complete cells, inside to the partial cells are plugged and formed integrally with the outer wall, there have been problems of large reduction in effective filtration area and increase in pressure loss, when used in a DPF, etc.

Patent Document 1: JP-B-1988-12658
Patent Document 2: JP-A-1995-246341
Patent Document 3: JP-A-2004-154768

DISCLOSURE OF THE INVENTION

The present invention has been made in view of the above-mentioned past situation. The present invention aims at providing a plugged honeycomb structure which causes neither large reduction in effective filtration area nor excessive increase in pressure loss, when used as a filter, and which is low in trouble and labor for the formation of plugged parts in partial cells of outermost peripheral portion and is superior in productivity.

In order to achieve the above aim, the present invention provides plugged honeycomb structures described below.

[1] A plugged honeycomb structure (a first, plugged honeycomb structure) comprising porous partition walls which form, by surrounding, a plurality of cells extending between the two ends faces of the honeycomb structure, and an outer wall formed integrally with the partition walls, wherein the cells consist of partial cells of outermost peripheral portion, having incomplete cell sections, which are located at the outermost peripheral portion of the honeycomb structure and are in partial contact with the outer wall, and complete cells having a complete cell section, other than the partial cells of outermost peripheral portion, and wherein, in the complete cells, a plugged part is formed at one end of each complete cell so that each end face of the honeycomb structure shows a checkerwise plugging pattern, and, in the partial cells of outermost peripheral portion to be plugged according to the above-mentioned plugging pattern, part of them is plugged in the entire length and formed integrally with the outer wall and remaining cells have each a plugged part only at one end.

[2] A plugged honeycomb structure according to [1], wherein, of the partial cells of outermost peripheral portion, those having a cell areal ratio determined by the following expression, of smaller than $S_1$ are plugged in the entire length and formed integrally with the outer wall, those having the cell areal ratio of larger than $S_2$ ($S_1 < S_2$) have each a plugged part only at one end according to the above-mentioned plugging pattern, and those having the cell areal ratio of $S_1$ or larger but $S_2$ or smaller include those plugged in the entire length and formed integrally with the outer wall and those having a plugged part only at one end according to the plugging pattern.

Cell areal ratio(%)=(area of partial cell of outermost peripheral portion)/(area of complete cell)×100

[3] A plugged honeycomb structure according to [2], wherein $S_1$ is a value of 30(%) or smaller [0(%) is excluded] and $S_2$ is a value of 2 to 30(%).

[4] A plugged honeycomb structure according to [2], wherein $S_1$ is 5(%) and $S_2$ is 30(%).

[5] A plugged honeycomb structure (a second, plugged honeycomb structure) comprising porous partition walls which form, by surrounding, a plurality of cells extending between the two ends faces of the honeycomb structure, and an outer wall formed integrally with the partition walls, wherein the cells consist of partial cells of outermost peripheral portion, having incomplete cell sections, which are located at the outermost peripheral portion of the honeycomb structure and are in partial contact with the outer wall, and complete cells having a complete cell section, other than the partial cells of outermost peripheral portion, and wherein, in the complete cells, a plugged part is formed at one end of each complete cell so that each end face of the honeycomb structure shows a checkerwise plugging pattern, and, in the partial cells of outermost peripheral portion, those having a cell areal ratio determined by the following expression, of smaller than $S_3$ are plugged in the entire length and formed integrally with the outer wall and those having the above-mentioned cell areal ratio of $S_3$ and larger have each a plugged part only at one end according to the above-mentioned plugging pattern.

Cell areal ratio(%)=(area of partial cell of outermost peripheral portion)/(area of complete cell)×100

[6] A plugged honeycomb structure according to [5], wherein $S_3$ is 30(%).

[7] A plugged honeycomb structure according to any of [1] to [6], wherein each plugged part has a rigidity lower than that of each partition wall and a heat capacity larger than that of each partition wall.

[8] A plugged honeycomb structure according to any of [1] to [7], wherein the material for each plugged part is aluminum titanate or a composite material thereof and the material for each partition wall is cordierite or a composite material thereof.

[9] A plugged honeycomb structure according to any of [1] to [8], wherein each plugged part has a thermal conductivity lower than that of each partition wall.

[10] A plugged honeycomb structure according to any of [1] to [9], wherein each plugged part has a thermal expansion coefficient lower than that of each partition wall.

According to the present invention, there is provided a plugged honeycomb structure which causes neither large reduction in effective filtration area nor excessive increase in pressure loss, when used as a filter, and which is low in trouble and labor for the formation of plugged parts in partial cells of outermost peripheral portion and is superior in productivity.

EXPLANATION OF SYMBOLS 1 is a plugged honeycomb structure (a first, plugged honeycomb structure); 3 is a partition wall; 4 is an outer wall; 5 is a partial cell of outermost peripheral portion; 6 is a complete cell; 8 is a plugged part; 11 is a plugged honeycomb structure (a second, plugged honeycomb structure); and 21 is a plugged honeycomb structure (a conventional, plugged honeycomb structure).

BEST MODE FOR CARRYING OUT THE INVENTION

Representative embodiments of the present invention are described specifically below. However, the present invention is not restricted to the following embodiments, and it should be construed that design changes, improvements, etc. may be added appropriately based on the ordinary knowledge possessed by those skilled in the art, as long as there is no deviation from the scope of the present invention.

Figure 1:
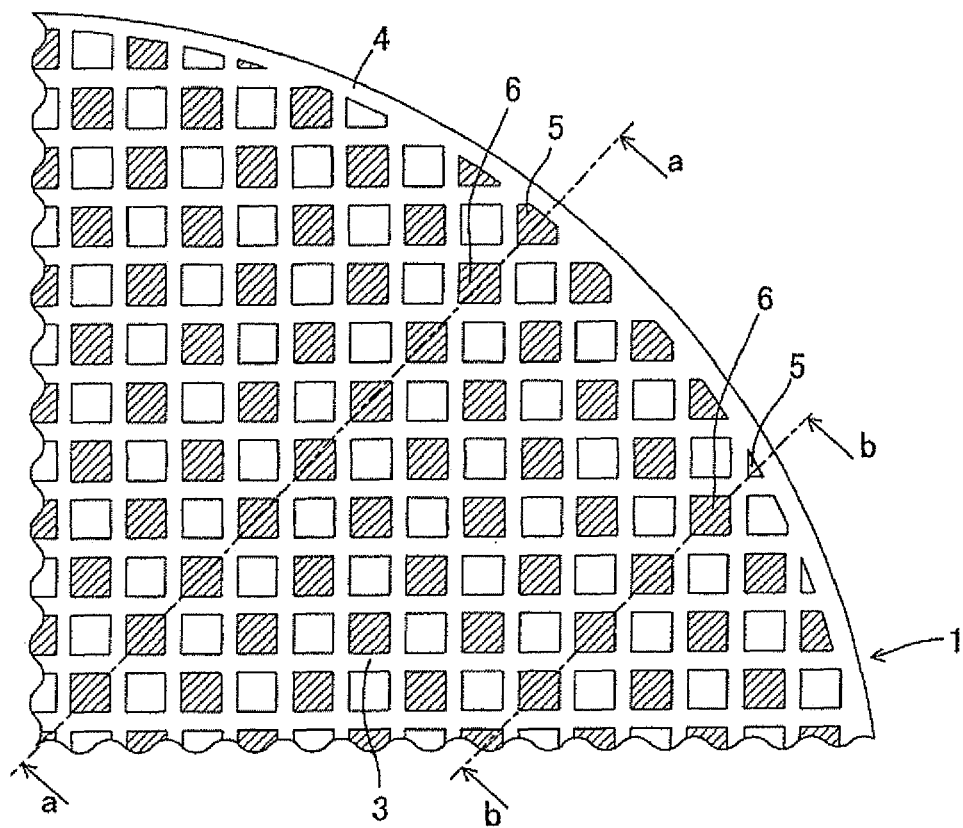
FIG. 1 is a plan view which partially shows the end face of the first, plugged honeycomb structure according to the present invention.
Figure 2:
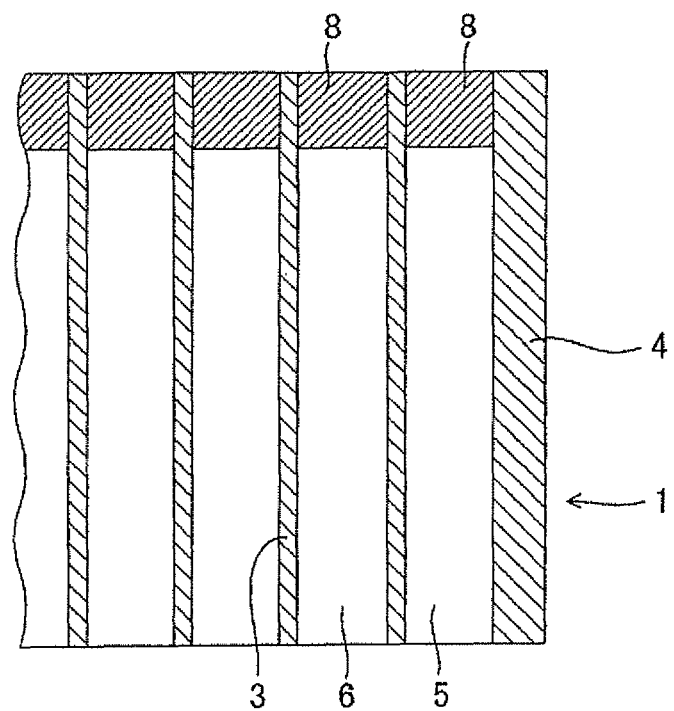
FIG. 2 is a partial sectional view showing the a-a section structure of FIG. 1.
Figure 3:
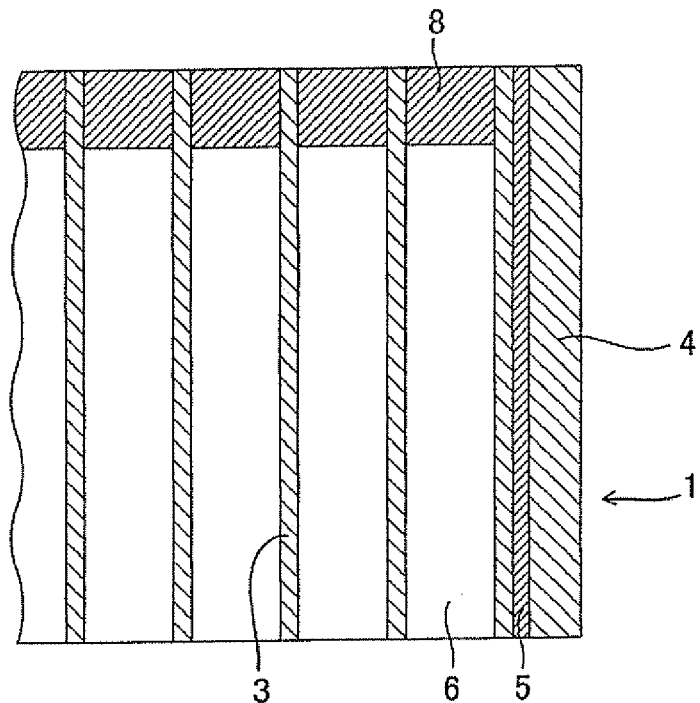
FIG. 3 is a partial sectional view showing the b-b section structure of FIG. 1.

FIG. 1 is a plan view which partially shows the end face of the first, plugged honeycomb structure according to the present invention; FIG. 2 is a partial sectional view showing the a-a section structure of FIG. 1; and FIG. 3 is a partial sectional view showing the b-b section structure of FIG. 1.

The first, plugged honeycomb structure 1 according to the present invention comprises porous partition walls 3 which form, by surrounding, a plurality of cells extending between the two ends faces of the honeycomb structure, and an outer wall 4 formed integrally with the partition walls 3. The cells consist of partial cells 5 of outermost peripheral portion, having incomplete cell sections, which are located at the outermost peripheral portion of the honeycomb structure and are in partial contact with the outer wall 4, and complete cells 6 having a complete cell section, other than the partial cells 5 of outermost peripheral portion.

In the complete cells 6, as in a conventional, plugged honeycomb structure used in a filter (e.g. a DPF), a plugged part 8 is formed at one end of each complete cell so that each end face of the honeycomb structure shows a checkerwise plugging pattern.

Meanwhile, in the partial cells 5 of outermost peripheral portion to be plugged according to the above-mentioned plugging pattern, part of partial cells 5 of them is plugged in the entire length and formed integrally with the outer wall 4 (see FIG. 3) and remaining part of partial cells 5 have each a plugged part 8 only at one end (see FIG. 2).

Thus, in the plugged honeycomb structure according to the present invention, all of the partial cells of outermost peripheral portion are not plugged and not formed integrally with the outer wall, but only part of the partial cells of outermost peripheral portion is plugged and formed integrally with the outer wall. Thereby, while large reduction in effective filtration area and excessive increase in pressure loss are being prevented, the number of the partial cells of outermost peripheral portion in which plugged parts are formed, can be reduced by a certain degree; the trouble and labor needed for formation of plugged parts in partial cells of outermost peripheral portion can be decreased; and both productivity and function of honeycomb structure can be achieved.

In the honeycomb structure according to the present invention, the portioning of those partial cells of outermost peripheral portion formed integrally with the outer wall and those partial cells of outermost peripheral portion in which a plugged part is formed only at one end of each cell is preferably conducted based on the cell areal ratio determined by the following expression.

Cell areal ratio(%)=(area of partial cell of outermost peripheral portion)/(area of complete cell)×100

That is, as shown in FIG. 3, of all the partial cells 5 of outermost peripheral portion to be plugged according to a plugging pattern in which each end face of honeycomb structure 4 shows a checkerwise pattern, those partial cells 5 of outermost peripheral portion having a cell areal ratio (determined by the above expression) of smaller than $S_1$ (a given value) are plugged in the entire length and formed integrally with the outer wall 4 of honeycomb structure.

Also, as shown in FIG. 2, those partial cells 5 of outermost peripheral portion having the above-mentioned cell areal ratio of larger than $S_2$ (a given value) ($S_1 < S_2$) have each a plugged part 8 only at one end according to the above-mentioned plugging pattern.

Further, those partial cells 5 having the cell areal ratio of $S_1$ or larger but $S_2$ or smaller include those plugged in the entire length and formed integrally with the outer wall 4 and those having a plugged part 8 only at one end according to the plugging pattern.

Thus, the portioning is preferably conducted based on the cell areal ratio. The reason is that the partial cells of outermost peripheral portion, as compared with the complete cells, have irregular shapes (partially-chipped shapes) and, particularly in those having a small cell areal ratio, formation of plugged part at one cell end is difficult and needs time and labor.

When only the performance of honeycomb structure when used in a filter (e.g. a DPF) is considered, it is desired that all the partial cells of outermost peripheral portion to be plugged have a plugged part at each one end. However, when the productivity of honeycomb structure is also considered, it is advantageous that those partial cells of outermost peripheral portion of small cell areal ratio in which formation of plugged part is difficult, are plugged in the entire length and formed integrally with the outer wall. Such integral-with-outer wall formation can be conducted relatively easily by, for example, adjusting the structure of the die used in extrusion of honeycomb structure.

In the first, plugged honeycomb structure according to the present invention, it is preferred that those partial cells of outermost peripheral portion of relatively large cell areal ratio in which formation of plugged part is relatively easy, are formed so as to have a plugged part for contribution to filter performance, those partial cells of outermost peripheral portion of relatively small cell areal ratio in which formation of plugged part is difficult, are formed integrally with the outer wall for higher productivity because the resulting plugging has a small adverse effect on effective filtration area and pressure loss, and those partial cells of outermost peripheral portion having such a cell areal ratio that the difficulty of formation of plugged part is medium, include those having a plugged part and those formed integrally with the outer wall.

In the first honeycomb structure according to the present invention, the cell areal ratio $S_1$ is preferably 30(%) or smaller, more preferably 10(%) or smaller, further preferably 5(%) or smaller [0(%) is excluded]. When the cell areal ratio $S_1$ is larger than 30(%), even relatively large partial cells of outermost peripheral portion are formed integrally with the outer wall in some cases, which may give a large adverse effect on effective filtration area and pressure loss.

The cell areal ratio $S_2$ is preferably 2 to 30(%), more preferably 2 to 10(%), further preferably 2 to 5(%). When the cell areal ratio $S_2$ is smaller than 2(%), even those partial cells of outermost peripheral portion in which formation of plugged part is considerably difficult, need to have a plugged part in some cases, which may reduce productivity. Meanwhile, when the cell areal ratio $S_2$ is larger than 30(%), even relatively large partial cells of outermost peripheral portion are formed integrally with the outer wall, which may give a large adverse effect on effective filtration area and pressure loss.

As a particularly preferable embodiment, there can be mentioned a constitution in which the cell areal ratio $S_1$ is 5(%) and the cell areal ratio $S_2$ is 30(%), in view of the balance between performance as a filter and productivity.

Figure 4:
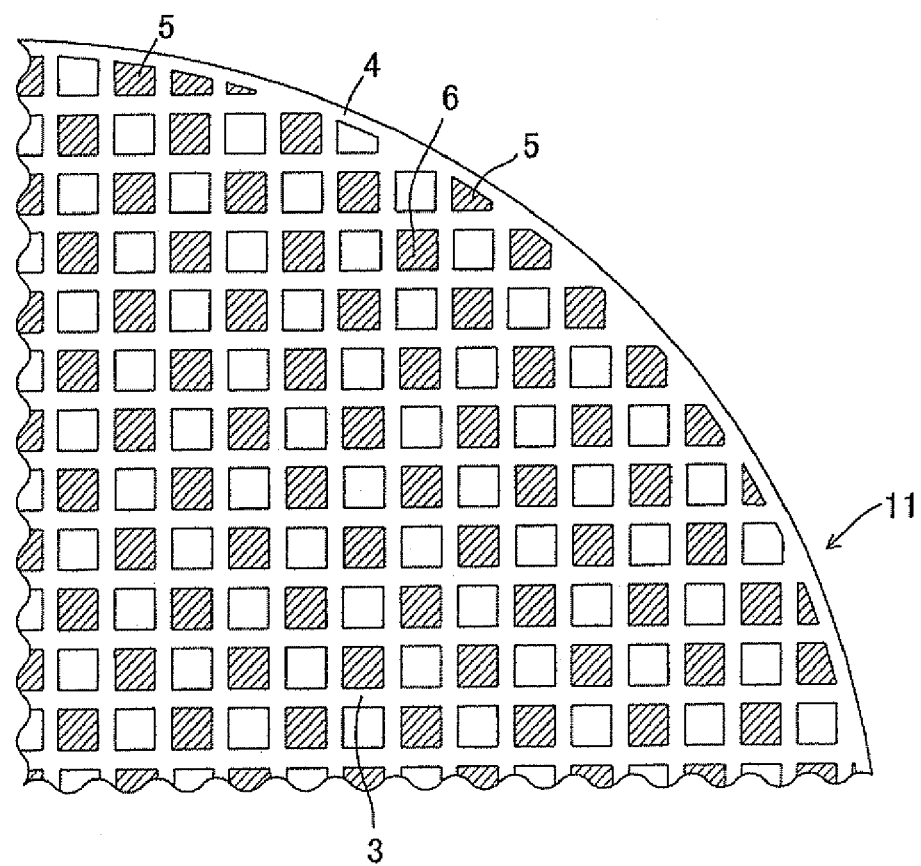
FIG. 4 is plan view which partially shows the end face of the second, plugged honeycomb structure according to the present invention.
Figure 5:
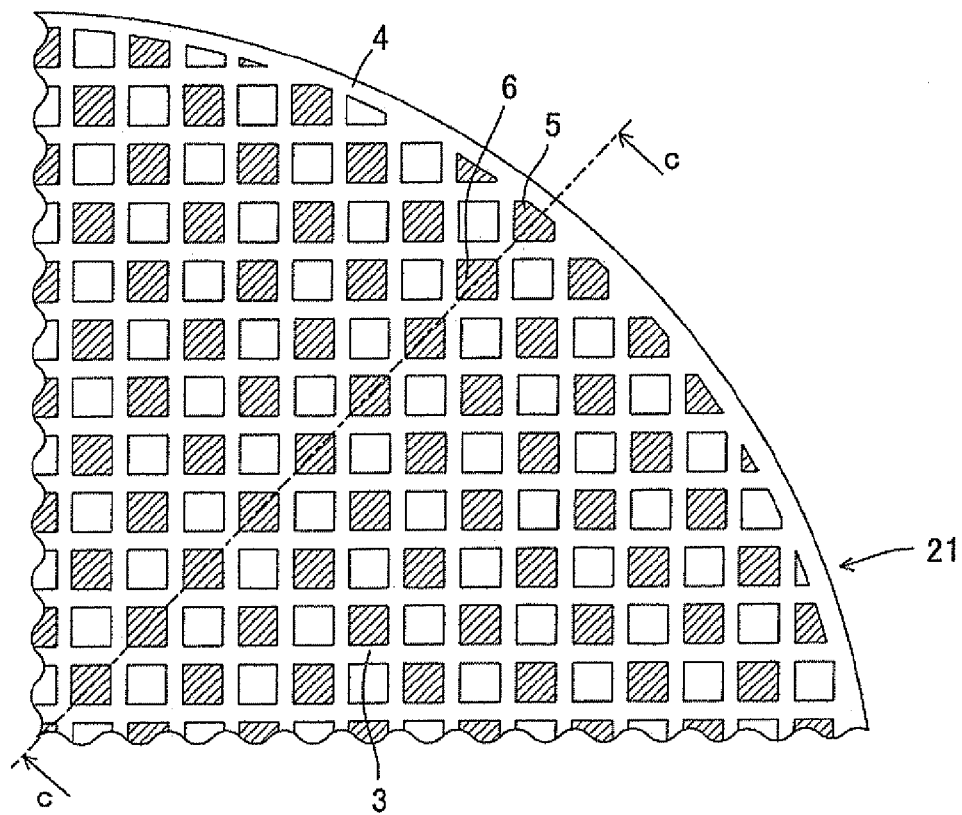
FIG. 5 is a plan view which partially shows the end face of a conventional, plugged honeycomb structure.
Figure 6:
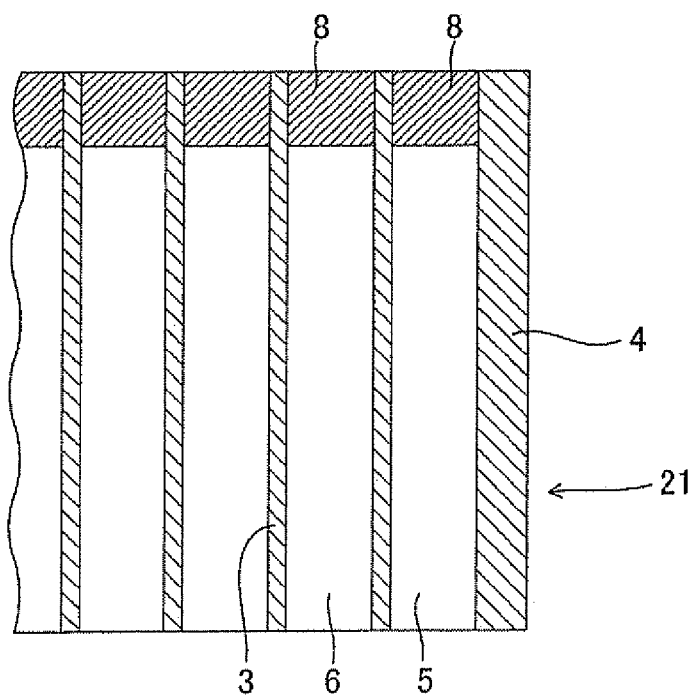
FIG. 6 is a partial sectional view showing an example of the c-c section structure of FIG. 5.

FIG. 4 is a plan view which partially shows the end face of the second, plugged honeycomb structure according to the present invention.

The second, plugged honeycomb structure according to the present invention, similarly to the above-mentioned, first, plugged honeycomb structure, comprises porous partition walls 3 which form, by surrounding, a plurality of cells extending between the two ends faces of the honeycomb structure, and an outer wall 4 formed integrally with the partition walls 3. The cells consist of partial cells 5 of outermost peripheral portion, having incomplete cell sections, which are located at the outermost peripheral portion of the honeycomb structure and are in partial contact with the outer wall 4, and complete cells 6 having a complete cell section, other than the partial cells 5 of outermost peripheral portion.

In the complete cells 6, as in a conventional, plugged honeycomb structure used in a filter (e.g. a DPF), a plugged part 8 is formed at one end of each complete cell so that each end face of honeycomb structure shows a checkerwise plugging pattern.

Meanwhile, of the partial cells 5 of outermost peripheral portion, those having a cell areal ratio determined by the following expression, of smaller than $S_3$ are plugged in the entire length and formed integrally with the outer wall and those having the above-mentioned cell areal ratio of $S_3$ and larger have each a plugged part only at one end according to the above-mentioned plugging pattern.

Cell areal ratio(%)=(area of partial cell of outermost peripheral portion)/(area of complete cell)×100

In this second, plugged honeycomb structure, those partial cells 5 of outermost peripheral portion, formed integrally with the outer wall are irrelevant to the plugging pattern. That is, even those partial cells 5 of outermost peripheral portion which need not be plugged when plugging is conducted so that each end face of honeycomb structure shows a checkerwise plugging pattern, are plugged in the entire length and formed integrally with the outer wall 4 as long as their cell areal ratios are smaller than $S_3$.

By thus forming all of those partial cells 5 of outermost peripheral portion having a cell areal ratio of smaller than $S_3$, integrally with the outer cell, the number of the partial cells of outermost peripheral portion in which a plugged part is formed, can be reduced by a certain degree and the trouble and labor needed for formation of plugged part in partial cells of outermost peripheral portion can be lessened.

Incidentally, in the second, plugged honeycomb structure, when plugging is conducted in the above-mentioned checkerwise plugging pattern, even part of those partial cells of outermost peripheral portion which need not be plugged regularly, are integrated with the outer wall. Therefore, as compared with the first, plugged honeycomb structure in which only part of the partial cells of outermost peripheral portion to be plugged in the above-mentioned plugging pattern is integrated with the outer wall, the second, plugged honeycomb structure is slightly disadvantageous in effective filtration area and pressure loss but the disadvantage can be minimized by making the value of $S_3$ somewhat small.

In the second, plugged honeycomb structure, the specific value of $S_3$ is preferably 30(%), more preferably 10(%), further preferably 5(%). When $S_3$ is larger than 30(%), even relatively large partial cells of outermost peripheral portion are integrated with the outer wall, which may give a large adverse effect on effective filtration area and pressure loss.

In production of a plugged honeycomb structure of the present invention, there is no particular restriction as to the method for forming given partial cells of outermost peripheral portion, integrally with the outer wall. However, for example, the following method can be mentioned. In general, a honeycomb structure is produced by extrusion using a die having a large number of cell blocks for formation of cells. In that case, by removing the very cell block of the die for formation of partial cells of outermost peripheral portion, a puddle is forced into the cell block-removed part of the die during extrusion and partial cells of outermost peripheral portion can be formed integrally with the outer wall.

As the method for forming a plugged part at one end of each given cell, a known conventional method can be used. Specifically explaining, a sheet is attached onto one end face of a honeycomb structure; then, holes are made at the portions of the sheet, corresponding to the cells to be plugged; the end face of the honeycomb structure, onto which the sheet has been attached, is immersed in a plugging slurry obtained by slurrying a plugging material, to fill the plugging slurry from the holes into one end of each cell to be plugged; thereafter, drying and/or firing is conducted to cure the filled plugging slurry to obtain each plugged part.

In the plugged honeycomb structure according to the present invention, there is no particular restriction as to the material for the main body of honeycomb structure excluding the plugged parts. However, when the plugged honeycomb structure is used in an environment exposed to a high temperature, such as one in which a DPF is used, the material is preferably constituted by a heat-resistant material (e.g. cordierite). Also, the material for the plugged parts is preferably be the same material as for the honeycomb structure main body, in order to suppress the difference in thermal expansion from the honeycomb structure main body.

Further, in the first, plugged honeycomb structure and the second, plugged honeycomb structure, both according to the present invention, it is preferred that the rigidity of each plugged part is lower than that of each partition wall and the heat capacity of each plugged part is larger than that of each partition wall, or the thermal conductivity of each plugged part is lower than that of each partition wall, or the thermal expansion coefficient of each plugged part is lower than that of each partition wall. In order to achieve such relationships, different materials may be selected for the outer walls and the plugged parts.

When the plugged honeycomb structure is used in applications such as DPF and the like, it is ordinary that the plugged honeycomb structure is compression-fixed (canned) in a cylindrical case in a state that its outer wall is wound by a holding material (e.g. a ceramic fiber mat). In the canning, a holding pressure is applied to the outer surface of the plugged honeycomb structure and, owing to this pressure, a stress is concentrated at the contact area between plugged part and partition wall, which tends to cause breakage. However, when the rigidity of each plugged part is made lower than that of each partition wall, even if there has occurred deformation of partition wall caused by the above-mentioned pressure application, deformation of plugged part follows the deformation of partition wall and, as a result, the above-mentioned stress concentration is relaxed, making the breakage unlikely to occur.

Further, in order to use the plugged honeycomb structure as a DPF continuously over a long period, it is necessary to conduct a regeneration treatment periodically. That is, in order to reduce the pressure loss which has been increased by the particulate accumulated inside the filter with the lapse of time and return the performance of the filter to its original state, it is necessary to burn and remove the particulate accumulated inside the filter. In this regeneration of filter, a large heat stress is generated at the end of the plugged part-formed honeycomb structure and this heat stress generates, in the honeycomb structure, drawbacks such as crack, breakage and the like in some cases; however, by making the rigidity of each plugged part lower than that of each partition wall, the heat stress can be relaxed and the generation of drawbacks can be suppressed.

Further, by making the heat capacity of each plugged part larger than that of each partition wall, the temperature increase caused by combustion of particulate in regeneration treatment can be suppressed by the heat storage effect of each plugged part and the melting and crack generation of partition wall, caused by excessive temperature increase can be prevented effectively.

Also, by making the thermal conductivity of each plugged part lower than that of each partition wall, the heat generated during the combustion of particulate is stored in the plugged part, whereby the temperature change at the end of honeycomb structure is made mild and the generation of thermal crack is suppressed.

Still further, by making the thermal expansion coefficient of each plugged part lower than that of each partition walls the difference in thermal expansion coefficient between plugged part and partition wall can prevent the generation of crack in partition wall even if each plugged part has reached a high temperature owing to its heat-storage effect. The thermal expansion coefficient of each plugged part is preferably made smaller than that of each partition wall in both of the cell passage direction and the cell sectional direction normal thereto.

When the plugged parts and the partition walls are allowed to satisfy the above-mentioned relationships of rigidity, heat capacity, thermal conductivity and thermal expansion coefficient, it is preferred that the material for partition wall is cordierite or a composite material thereof and the material for plugged part is aluminum titanate (hereinafter, referred to as "AT") or a composite material thereof.

With respect to the material for plugged part, it is particularly preferred that the material contains an AT crystalline phase by 60% or more, other crystalline phase is composed of at least one member selected from rutile, corundum and mullite, and the glass phase is 5% or less of AT.

The Young's modulus of AT is about 1/10 of that of cordierite. Since the Young's modulus of AT decreases as the crystal amount of AT increases, a higher crystal amount of AT is preferred. Further, since the Young's modulus of AT decreases as the average crystal grain diameter of AT increases, a larger average crystal grain diameter of AT is preferred. The Young's modulus of AT changes with the crystal amount of AT, the average crystal grain diameter of AT and the porosity and is 0.1 to about 50 GPa. The average crystal grain diameter is preferred to be less than 10 μm from the standpoint of heat cycle durability; however, since each plugged part ordinarily has a sufficient thickness as compared with each partition wall and the heat cycle durability is not necessarily considered as important, the average crystal grain diameter of AT may be 10 μm or more when an AT material is used for each plugged part, and such an average diameter is rather advantageous because the Young's modulus of plugged part can be decreased. However, the average crystal grain diameter is preferably less than 100 μm from the standpoint of reduction in compression strength of material.

Incidentally, the specific heat of cordierite and the specific heat of AT are about equal, and they are 500 to 1,000 J/kgK. Since heat capacity [J/K] is a product of mass [kg] and specific heat [J/kgK], heat capacity [J/m$^3$K] per unit volume can be expressed as a product of true specific gravity (density) [kg/m$^3$] and specific heat [J/kgK]. Since the true specific gravity of cordierite is about 2.5 and the true specific gravity of AT is about 3.6, the heat capacity of AT becomes 1.44 times that of cordierite when cordierite and At are assumed to have equivalent porosities.

As a general tendency, an increase in porosity results in decreases in strength and Young's modulus. Therefore, by making the porosity of AT smaller than that of cordierite, the AT can have an increased Young's modulus. However, since the Young's modulus of AT is as small as about ⅒ of that of cordierite, AT shows a Young's modulus which is sufficiently small as compared with that of cordierite, even if the porosity of AT has been reduced. Thus, by making the porosity of AT smaller than that of cordierite, AT can express a heat capacity larger than that of cordierite and a Young's modulus smaller than that of cordierite.

Further, the thermal expansion coefficient and thermal conductivity of AT decrease with an increase in the crystal amount of AT. Therefore, a larger crystal amount of AT is preferred and the AT crystal amount is preferably 60% or more. The thermal expansion coefficient (40 to 800° C.) of AT is about −2.0×10$^{-6}$/° C. to 4.0×10$^{-6}$/° C. The thermal conductivity of At is about 3.0 W/mK or less. The thermal conductivity of cordierite is about 1.0 W/mK or less. However, the thermal conductivity of AT can be made smaller than that of cordierite by increasing the AT crystal amount of AT. In a honeycomb structure made of cordierite, the thermal expansion coefficient (A axis) of 40 to 800° ° C. is ordinarily 1.5×10$^{-6}$/° C. or less. Since aluminum titanate has a Young's modulus smaller than that of cordierite, the AT of plugged part may have a thermal expansion higher than that of the cordierite of partition wall; however, by allowing the AT to have a lower thermal expansion, the stress at the boundary between partition wall and plugged part can be further decreased, which is preferred.

In the present invention, there is no particular restriction as to the shape of honeycomb structure. For example, the shape of the section of honeycomb structure normal to the central axis of columnar structure may be any shape selected from polygon (e.g. tetragon), circle, oval, ellipse, etc. There is no particular restriction, either, as to the sectional shape of cell, and it may be triangle, tetragon, hexagon, octagon, circle or a combination thereof.

When the plugged honeycomb structure is used as a filter (e.g. a DPF), the thickness of partition wall of honeycomb structure is preferably 100 to 2,000 μm, more preferably 200 to 1,000 μm, further preferably 300 to 700 μm. When the thickness of partition wall is less than 100 μm, there is a case of insufficient strength and low thermal shock resistance. Meanwhile, when the thickness of partition wall is more than 2,000 μm, pressure loss tends to increase.

The cell density of honeycomb structure is preferably 20 to 600 cells/in$^2$ (cpsi), more preferably 50 to 400 cpsi, further preferably 100 to 300 cpsi. When the cell density is less than 20 cpsi, the efficiency of contact with exhaust gas tends to be insufficient. Meanwhile, when the cell density is more than 600 cpsi, pressure loss tends to increase. Incidentally, "cpsi" is an abbreviation of "cells per square inch" and is a unit expressing the number of cells per square inch. For example, 10 cpsi is about 1.55 cells/cm$^2$.

The porosity of honeycomb structure is preferably 30 to 90%, more preferably 45 to 80%, particularly preferably 50 to 70%. By making the porosity 30 to 90%, the pressure loss can be reduced and further the mechanical strength of structure can be maintained.

The average pore diameter of honeycomb structure is preferably 5 to 500 μm. When the average pore diameter is less than 5 μm, the pressure loss tends to increase. Meanwhile, when the average pore diameter is more than 500 μm, the efficiency of capturing when used as a filter tends to decrease.

As to the application of the plugged honeycomb structure of the present invention, there is no particular restriction. However, the present plugged honeycomb structure can be used particularly preferably as a filter such as DPF or the like.

EXAMPLES

The present invention is described in more detail below by way of Examples. However, the present invention is no way restricted to these Examples.

Example 1

There was produced a plugged honeycomb structure constituted by a cordierite-made, porous main body of 152 mm in length, 144 mm in outer diameter, 300 μm in partition wall thickness, square in cell shape and 300 cpsi in cell density, in which main body, in the complete cells, a plugged part was formed at one end of each complete cell so that each end face of honeycomb structure showed a checkerwise plugging pattern, and, in the partial cells of outermost peripheral portion to be plugged according to the above-mentioned plugging pattern, those having a cell areal ratio determined by the above-shown expression, of smaller than 5% were plugged in the entire length and formed integrally with the outer wall of honeycomb structure main body, those having a cell areal ratio of larger than 30% had each a plugged part only at one end according to the above-mentioned plugging pattern, and those having a cell areal ratio of 5 to 30% included those plugged in the entire length and formed integrally with the outer wall and those having a plugged part only at one end according to the plugging pattern. Incidentally, the material for each plugged part is cordierite and is the same as for the main body of honeycomb structure. This plugged honeycomb structure was measured for pressure loss and subjected to forced regeneration test and quick heating and quick cooling test, all according to the methods described below.

Comparative Example 1

There was produced a plugged honeycomb structure constituted by the same main body as used in Example 1, in which main body, all of the partial cells of outermost peripheral portion were plugged in the entire length and formed integrally with the outer wall of honeycomb structure main body, or had each a plugged part only at one end, all of each two complete cells inside each partial cell of outermost peripheral portion were also plugged, and remaining complete cells each had a plugged part at one end so that each end face of the honeycomb structure showed a checkerwise plugging pattern. Incidentally, the material for each plugged part is cordierite and is the same as for the main body of honeycomb structure. This plugged honeycomb structure was measured for pressure loss and subjected to forced regeneration test and quick heating and quick cooling test, all according to the methods described below.

Example 2

There was produced a plugged honeycomb structure constituted by a cordierite-made, porous main body of 152 mm in length, 144 mm in outer diameter, 410 μm in partition wall thickness, combination of octagon and square in cell shape and 300 cpsi in cell density, in which main body, in the complete cells, a plugged part was formed at one end of each complete cell so that each end face of honeycomb structure showed a checkerwise plugging pattern, and, in the partial cells of outermost peripheral portion, those having a cell areal ratio determined by the above-shown expression, of smaller than 10% were plugged in the entire length and formed integrally with the outer wall and those having a cell areal ratio of 10% and larger had each a plugged part only at one end according to the above-mentioned plugging pattern. Incidentally, the material for each plugged part is cordierite and is the same as for the main body of honeycomb structure. This plugged honeycomb structure was measured for pressure loss and subjected to forced regeneration test and quick heating and quick cooling test, all according to the methods described below.

Comparative Example 2

There was produced a plugged honeycomb structure constituted by the same main body as used in Example 2, in which main body, all of the partial cells of outermost peripheral portion were plugged in the entire length and formed integrally with the outer wall of honeycomb structure main body, all of each two complete cells inside each partial cell of outermost peripheral portion were also plugged, and remaining complete cells each had a plugged part at one end so that each end face of the honeycomb structure showed a checkerwise plugging pattern. Incidentally, the material for each plugged part is cordierite and is the same as for the main body of honeycomb structure. This plugged honeycomb structure was measured for pressure loss and subjected to forced regeneration test and quick heating and quick cooling test, all according to the methods described below.

Example 3

There was produced a plugged honeycomb structure having the same constitution as in Example 1 except that each plugged part was made of a material composed mainly of AT (AT content: 90 mass %). This plugged honeycomb structure was subjected to forced regeneration test and quick heating and quick cooling test, both according to the methods described below.

Example 4

There was produced a plugged honeycomb structure having the same constitution as in Example 2 except that each plugged part was made of a material composed mainly of AT (AT content: 90 mass %). This plugged honeycomb structure was subjected to forced regeneration test and quick heating and quick cooling test, both according to the methods described below.

(Measurement of Pressure Loss)

A plugged honeycomb structure was disposed in a soot generator; a burner exhaust gas of about 200° C. was introduced into the plugged honeycomb structure to deposit (capture) soot inside the plugged honeycomb structure; and the pressure loss of plugged honeycomb structure caused by the deposited soot was measured. The soot generator is equipped with a combustion chamber capable of generating a large amount of soot by burning a gas oil therein, a passage through which the combustion gas and soot generated in the combustion chamber can pass, and a test chamber connected to the passage, in which a plugged honeycomb structure is disposed so as to deposit a large amount of soot therein in a short time. A fuel is fed into the combustion chamber, and a flow meter is disposed in the combustion chamber so as to enable the feeding of air or, as necessary, oxygen. A flow meter is disposed in the passage so as to enable the feeding of air or, as necessary, oxygen and nitrogen. In the test chamber are disposed a thermocouple for temperature measurement, connected to a recorder, and a pressure gauge for measurement of the inside pressure of test chamber. Also, the test chamber is connected to an exhaust duct through which the gas (which has income from the passage and has passed the plugged honeycomb structure) is discharged. The temperature of the test chamber when an exhaust gas was introduced into the plugged honeycomb structure for soot deposition (capturing), was about 200° C., and the amount of gas flow was 2.5 $Nm^3$/min. In this case, the amount of soot generation was about 20 g per hour.

Each of the plugged honeycomb structures of Examples 1 and 2 and Comparative Examples 1 and 2 was measured for pressure loss according to the above-mentioned method. As a result, the pressure loss of the plugged honeycomb structure of Example 1 was lower by about 7% than that of the plugged honeycomb structure of Comparative Example 1, and the pressure loss of the plugged honeycomb structure of Example 2 was lower by about 5% than that of the plugged honeycomb structure of Comparative Example 2.

(Forced Regeneration Test)

A plugged honeycomb structure was disposed in the same soot generator as used in the above-mentioned measurement of pressure loss; and a burner exhaust gas of about 200° C. was introduced into the plugged honeycomb structure to deposit (capture) soot inside the plugged honeycomb structure. In this way, the amount of soot deposited was increased gradually in a range of 5 to 15 g/L per the unit volume of plugged honeycomb structure. Then, an exhaust gas of 650 to 700° C. was introduced into the plugged honeycomb structure to burn the deposited soot to conduct a forced regeneration test. The temperature of the test chamber when an exhaust gas was introduced into the plugged honeycomb structure for soot deposition (capturing), was about 200° C., and the amount of gas flow was 9 $Nm^3$/min. In this case, the amount of soot generation was about 90 g per hour. The flow amount of the exhaust gas of 650 to 700° C. when the soot deposited in the plugged honeycomb structure was burnt, was 1.5 $Nm^3$/min.

In this test, when the amount of soot deposited before the forced regeneration test is increased gradually and when a certain deposition amount is reached, the partition walls cause partial melting owing to the combustion heat of soot during forced regeneration, at around the plugged parts of exhaust gas outlet side of plugged honeycomb structure. As the soot deposition amount when the melting appears, is larger, the melting resistance of plugged honeycomb structure is higher, which is preferred.

The forced regeneration test was conducted for each of the plugged honeycomb structures of Examples 1 to 4 and Comparative Examples 1 and 2. As a result, the plugged honeycomb structures of Examples 3 and 4, whose plugged parts were made of a material composed mainly of AT, as compared with the plugged honeycomb structures of Examples 1 and 2 and Comparative Examples 1 and 2, whose plugged parts were made of cordierite, were large in soot deposition amount when melting appeared, and showed high melting resistance.

(Quick Heating and Quick Cooling Test)

A plugged honeycomb structure was disposed in a burner using LPG as the fuel and subjected to repeated, quick heating and quick cooling in a temperature range of 100 to 700° C. In this test, when the cycle number of quick heating and quick cooling is increased, part of the partition walls of plugged honeycomb structure gives rise to cracking at around the plugged parts of exhaust gas inlet side of plugged honeycomb structure, at a certain cycle number. As the cycle number when this cracking appears, is larger, the plugged honeycomb structure has higher thermal shock resistance, which is preferred.

The quick heating and quick cooling test was conducted for each of the plugged honeycomb structures of Examples 1 to 4 and Comparative Example 1 and 2. As a result, the plugged honeycomb structures of Examples 3 and 4, whose plugged parts were made of a material composed mainly of AT, as compared with the plugged honeycomb structures of Examples 1 and 2 and Comparative Examples 1 and 2, whose plugged parts were made of cordierite, were large in the cycle number when cracking appeared, and showed high thermal shock resistance.

INDUSTRIAL APPLICABILITY

The plugged honeycomb structure of the present invention can be used preferably, for example, as a filter (e.g. a DPF).

The invention claimed is:

1. A plugged honeycomb structure comprising:
porous partition walls which form, by surrounding, a plurality of cells extending between the two ends faces of the honeycomb structure; and
an outer wall formed integrally with the partition walls;
the cells consisting of:
partial cells of outermost peripheral portion, having incomplete cell sections, which are located at the outermost peripheral portion of the honeycomb structure and are in partial contact with the outer wall; and
complete cells having a complete cell section, other than the partial cells of outermost peripheral portion;
wherein:
in the complete cells, a plugged part is formed at one end of each complete cell so that each end face of the honeycomb structure shows a checkerwise plugging pattern, and, in the partial cells of outermost peripheral portion to be plugged according to the above-mentioned plugging pattern, part of them is plugged in the entire length and formed integrally with the outer wall and remaining cells have each a plugged part only at one end;
of the partial cells of outermost peripheral portion, those having a cell areal ratio determined by the following expression, of smaller than $S_1$ are plugged in the entire length and formed integrally with the outer wall, those having the cell areal ratio of larger than $S_2$ ($S_1 < S_2$) have each a plugged part only at one end according to the above-mentioned plugging pattern, and those having the cell areal ratio of $S_1$ or larger but $S_2$ or smaller include those plugged in the entire length and formed integrally with the outer wall and those having a plugged part only at one end according to the plugging pattern; wherein $S_1$ is a value of 30(%) or smaller [0(%) is excluded] and $S_2$ is a value of 2 to 30(%); and the cell area ratio (%)=(area of partial cell of outermost peripheral portion)/(area of complete cell) ×100.

2. A plugged honeycomb structure according to claim 1, wherein $S_1$ is 5(%) and $S_2$ is 30(%).

3. A plugged honeycomb structure according to claim 1, wherein each plugged part has a rigidity lower than that of each partition wall and a heat capacity larger than that of each partition wall.

4. A plugged honeycomb structure according to claim 1, wherein the material for each plugged part is aluminum titanate or a composite material thereof and the material for each partition wall is cordierite or a composite material thereof.

5. A plugged honeycomb structure according to claim 1, wherein each plugged part has a thermal conductivity lower than that of each partition wall.

6. A plugged honeycomb structure according to claim 1, wherein each plugged part has a thermal expansion coefficient lower than that of each partition wall.

7. A plugged honeycomb structure comprising:
porous partition walls which form, by surrounding, a plurality of cells extending between the two ends faces of the honeycomb structure; and
an outer wall formed integrally with the partition walls;
the cells consisting of:
partial cells of outermost peripheral portion, having incomplete cell sections, which are located at the outermost peripheral portion of the honeycomb structure and are in partial contact with the outer wall; and
complete cells having a complete cell section, other than the partial cells of outermost peripheral portion;
wherein:
in the complete cells, a plugged part is formed at one end of each complete cell so that each end face of the honeycomb structure shows a checkerwise plugging pattern, and, in the partial cells of outermost peripheral portion, those having a cell areal ratio determined by the following expression, of smaller than $S_3$ are plugged in the entire length and formed integrally with the outer wall and those having the above-mentioned cell areal ratio of $S_3$ and larger have each a plugged part only at one end according to the above-mentioned plugging pattern; wherein $S_3$ is 30(%); and the cell area ratio (%)=(area of partial cell of outermost peripheral portion)/(area of complete cell)×100.

8. A plugged honeycomb structure according to claim 7, wherein each plugged part has a rigidity lower than that of each partition wall and a heat capacity larger than that of each partition wall.

9. A plugged honeycomb structure according to claim 7, wherein the material for each plugged part is aluminum titanate or a composite material thereof and the material for each partition wall is cordierite or a composite material thereof.

10. A plugged honeycomb structure according to claim 7, wherein each plugged part has a thermal conductivity lower than that of each partition wall.

11. A plugged honeycomb structure according to claim 7, wherein each plugged part has a thermal expansion coefficient lower than that of each partition wall.

* * * * *